United States Patent [19]  [11] 4,147,651
Oh  [45] * Apr. 3, 1979

[54] BIPHENYL BASED LIQUID CRYSTAL COMPOSITIONS

[75] Inventor: Chan S. Oh, Diamond Bar, Calif.

[73] Assignee: Beckman Instruments, Inc., Fullerton, Calif.

[*] Notice: The portion of the term of this patent subsequent to Apr. 11, 1995, has been disclaimed.

[21] Appl. No.: 502,659

[22] Filed: Sep. 3, 1974

[51] Int. Cl.$^2$ ............................ C09K 3/34; G02F 1/13
[52] U.S. Cl. ................................... 252/299; 252/408; 350/350
[58] Field of Search .............................. 252/408, 299; 350/160 LC, 150, 350

[56] References Cited

U.S. PATENT DOCUMENTS

| | | | |
|---|---|---|---|
| 3,781,088 | 12/1973 | Tsukamoto et al. | 252/408 LC |
| 3,792,915 | 2/1974 | Oh et al. | 252/408 LC |
| 3,815,972 | 6/1974 | Hsieh | 252/408 LC |
| 3,819,531 | 6/1974 | Saeva et al. | 252/408 LC |
| 3,836,478 | 9/1974 | Green et al. | 252/408 LC |
| 3,876,286 | 4/1975 | Deutscher et al. | 252/299 |
| 3,891,307 | 6/1975 | Tsukamoto et al. | 252/299 |
| 3,915,883 | 10/1975 | VanMeter et al. | 252/299 |
| 3,954,653 | 5/1976 | Yamazaki | 252/299 |
| 4,011,173 | 3/1977 | Steinstrasser | 252/299 |
| 4,043,935 | 8/1977 | Kanbe | 252/299 |
| 4,046,708 | 9/1977 | Dubois | 252/299 |
| 4,083,797 | 4/1978 | Oh | 252/299 |

FOREIGN PATENT DOCUMENTS

| | | | |
|---|---|---|---|
| 807165 | 3/1974 | Belgium | 252/299 |
| 814291 | 8/1974 | Belgium | 252/299 |
| 2024269 | 12/1971 | Fed. Rep. of Germany | 252/299 |
| 2139628 | 2/1973 | Fed. Rep. of Germany | 252/299 |
| 2306738 | 8/1973 | Fed. Rep. of Germany | 252/299 |
| 2306739 | 8/1973 | Fed. Rep. of Germany | 252/299 |
| 2327036 | 12/1973 | Fed. Rep. of Germany | 252/299 |
| 2502904 | 7/1975 | Fed. Rep. of Germany | 252/299 |
| 2252132 | 6/1975 | France | 252/299 |
| 5023385 | 3/1975 | Japan | 252/299 |

OTHER PUBLICATIONS

Gray, G. W. et al., Electronics Lett., vol. 9, No. 6, pp. 130–131, (Mar. 22, 1973).

Primary Examiner—Benjamin R. Padgett
Assistant Examiner—T. S. Gron
Attorney, Agent, or Firm—R. J. Steinmeyer; F. L. Mehlhoff; R. S. Frieman

[57] ABSTRACT

Nematic liquid crystal compositions containing 4'-substituted-4-cyanobiphenyl and 4, 4'-disubstituted phenyl benzoate liquid crystal compositions which can be actuated at low voltages, e.g., under 3.5 Vrms in a 12.5 micron thick twisted nematic liquid crystal display.

10 Claims, No Drawings

BIPHENYL BASED LIQUID CRYSTAL COMPOSITIONS

BACKGROUND OF THE INVENTION

This invention relates to nematic liquid crystal compositions, devices using liquid crystals for information handling and display and to synthesis of liquid crystals.

More particularly, this invention relates to liquid crystal compositions in which the dominant constituent is one or more positive dielectric anisotropy nematic liquid crystals having the general formula

wherein R is alkyl or alkoxy having from 1 to 9 carbon atoms.

References Nos. 1 through 14, listed at the end of the specification provide a background of the general subject matter of the present patent and References Nos. 15 through 22 relate more particularly to the compounds discussed herein. The content and disclosure of these references is incorporated herein by reference and a knowledge of the disclosures of these references is assumed. The operation and construction of twisted nematic liquid crystal display units of the type referred to hereinafter are described in these references.

Biphenyl based nematic liquid crystals, "nematogens", are taught in the prior art and considerable work has been done by Gray (Reference 19) and his co-workers. Biphenyl nematogens are considerably more stable than Schiff base compounds and can be actuated with lower saturation voltages than Schiff base. The disadvantageous temperature characteristics of certain of the biphenyl nematogens can be overcome by mixing alkyl and/or alkoxy cyanobiphenyls having differing alkyl and/or alkoxy substituents and low threshold voltages, $V_{th}$, and saturation voltages, $V_{sat}$, characterize these compositions. Gray et al (Reference 19) report, for example, that for a particularly attractive member of this class of compounds, 4'-n-pentyl-4-cyanobiphenyl, "PCBP" $V_{th}$ was 1.1 $V_{rms}$ and an applied voltage of 3 $V_{rms}$ the compound gave acceptable decay and rise times of 150 and 100 milliseconds, "ms".

Lack of general availability of high quality alkyl and alkoxy cyanobiphenyl nematic liquid crystal compounds, the extremely high cost of such compunds, and the poor nematic temperature ranges exhibited by many of these class of compounds suggested the desirability of alternative compositions which would retain the advantages of biphenyl nematogens and obviate the principal disadvantges of these materials.

One important feature of this invention is the provision of compositions which to a large extent retain the advantages of biphenyl nematogens but reduce the cost and make production of display devices which are actuated with low voltages, i.e. 3.5 Vrms or less, technically, as well as economically, feasible.

Cholesteric liquid crystals have been studied in detail but have not found practical application in information display or handling devices of the type here being considered. It has been suggested (Reference 15) the presence of a small amount of optically active material may preferentially induce one of two equally probable twists in twisted nematic devices and reverse twist induced patches and certain problems related to electric field induced patches are eliminated by the addition of cholesteric compounds to nematic liquid crystal compositions (References 16 and 17.)

One of the features of this invention is the discovery that the decay time of a twisted nematic liquid crystal display device, when actuated with voltges above Vsat, can be significantly improved by the addition of trace amounts of certain optically active liquid crystal constituents.

Summary of the Invention

Cyanobiphenyl liquid crystal constituents are blended with certain selected ester liquid crystal constituents to provide a nematic temperature range and which can be actuated with voltages of about 3 Vrms.

Positive dielectric anisotropy (PDA) cyanobiphenyl liquid crystal in proportions of from about 10 to about 80 percent are mixed with from about 90 to about 20 percent of liquid crystal esters selected from the group consisting of

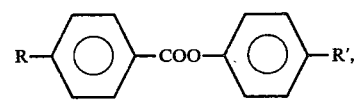

wherein R is lower alkyl or alkoxy groups having 1 to 7 carbon atoms and R' is methoxy group, or wherein R is methoxy group and R' is lower alkyl or alkoxy groups having 1 to 7 carbon atoms;

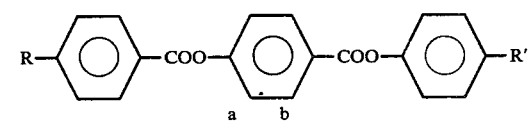

wherein R and R' are alkyl groups of 1 to 7 carbon atoms and a and b are hydrogen or chlorine and either a or b but not both a and b may be chlorine; and

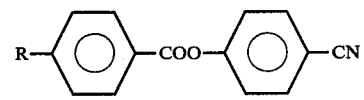

wherein R is a lower alkyl or alkoxy group having from 1 to 9 carbon atoms.

Various complex blends of two or more of the ester constituents are included in the invention and such blends can be used to obtain particularly advantageous nematic temperature range and actuation voltage characteristics in compositions in which a dominant constituent is one or more cyanobiphenyls selected from the group defined above.

Many substituted phenyl benzoate liquid crystals were found to be incompatible with 4'-substituted-4-cyanobiphenyl nematogens, in that they form smectic mesophase across a broad concentration range. The formation of this smectic mesophase is an extremely interesting phenomenon since, in general, none of the constituents themselves formed smectic mesophase; nevertheless such mixtures are useless or, at best, of very limited potential use in nematic liquid crystal systems.

One of the particularly interesting and valuable facets of the present invention is the discovery that these biphenyl induced smectic mesophases could be suppressed below subambient temperatures while maintaining high nematic-isotropic transition temperatues by forming ternary mixture liquid crystals, in which at least one component is I and/or II and second component is 4'-substituted-4-cyanobiphenyls and the third component can be

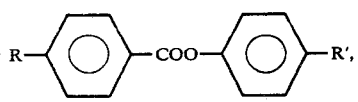

IV wherein R and R' is lower alkyl or alkoxy groups of 1 to 7 carbon atoms.

Optically active liquid crystal constituents may be added to reduce the decay time upon actuation at voltages above the saturation voltage.

DESCRIPTION OF THE INVENTION

There are several routes potentially available to obtain a less expensive liquid crystal composition which would have the advantges of the cyanobiphenyls. One route, a more direct synthesis starting with readily available intermediates, is the subject of a copending patent application. Other routes, such as varying the substituent groups, mixing cyanobiphenyls, etc., are also potentially available. Still another route is to blend the cyanobiphenyl PDA liquid crystal constituent with a negative dielectric anisotropy (NDA) constituent. Compositions of this type which include Schiff base liquid crystal compositions exhibited degredation, however, and were not entirely satisfactory liquid crystals for use in twisted nematic liquid crystal data handling and display devices in which liquid crystals presently find greatest utility, see References 1-14.

In arriving at the present invention, cyanobiphenyl liquid crystal constituents were blended with ester based liquid crystals in the hope of obtaining a less expensive liquid crystal composition which would be nematic over a wide range of temperatures and constituent variation, stable in use, and capable of being actuated with low voltages, e.g. about 1.5 to 3.5 volts, referred to below simply as "3 volt" devices.

Accordingly, 4-cyano-4'-n-pentylbiphenyl was mixed with 4'-n-hexloxyphenyl-4-n-butylbenzoate in proportions varying from 0 to 100 percent of each component. While neither component exhibited a smectic phase in the range of ambient temperature the mixture developed smectic phase between 20 and 80 weight percent of 4-cyano-4'-n-pentylbiphenyl leaving only high concentrations of either component predominantly nematic. A system as complex as this was considered impractical and did not show particular advantage technically.

Similar results were obtained mixing 4-cyano-4'-n-pentyl-biphenyl with 4'-anisylidene-4-n-butylaniline and also with 4'-n-hexyloxyphenyl-4-n-butylbenzoate. 4-cyano-4'-n-octyloxybiphenyl mixed with the same Schiff base and the same ester also formed a smectic phase and gave an extremely complex phase diagram.

These data, and similar results using other cyanobiphenyl-ester type liquid crystals suggested that this approach was not valid. The unfavorable prognosis of this approach was supported by analysis of the phase diagrams of the systems studied, which indicated that the interaction resulting in smectic phase was lateral attraction and not terminal cohesion. Notwithstanding the unfavorable results and the negative predictions, the work was carried on and it was found that certain selected ester type liquid crystals are sufficiently compatable with cyanobiphenyls to provide new liquid crystal compositions which have extremely advantageous properties.

The class of esters of the formula

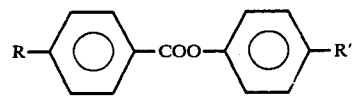

wherein R and R' are lower alkyl or alkoxy groups having 1 to 7 carbon atoms are not generally suitable for mixing with cyanobiphenyls, as these mixtures become smectic or otherwise unusable, however, two groups of compounds within this class have been found to be suitable in combination with cyanobiphenyls.

Compounds of the class

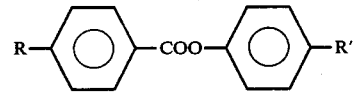

wherein R is methoxy and R' is a 1 to 7 carbon atom alkyl or alkoxy group, and wherein R is a 1 to 7 carbon atom alkyl or alkoxy group and R' is methoxy are miscible in widely varying proportions with cyanobiphenyls and give liquid crystal compositions.

For example, mixtures of 4-cyano-4'-n-pentylbiphenyl and 4'-n-butylphenyl-4-anisoate in proportions of 0 to 100 percent showed a continuous nematic isotropic transition temperature line and no smectic phase. The nematic temperature range was from below 0° C. to about 28° C. for a 50 mole percent mixture of 4-cyano-4'-n-pentylbiphenyl in 4'-n-butylphenyl-4-anisoate.

No theoretical explanation has been developed as to why compounds of this class,

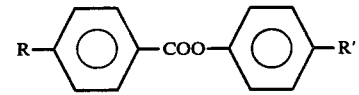

in which both R and R' are alkyl or alkoxy with more than one carbon atom are unsuited for blending with cyanobiphenyls; however, it is postulated that the relative polar contribution of the methoxy group, as compared with higher alkoxy groups and with alkyl groups effects the compatibility with cyanobiphenyls.

Members of another class of esters, compounds having the formula

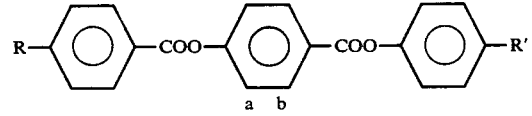

wherein R and R' are alkyl groups of 1 to 7 carbon atoms and a and b are hydrogen and either a or b, but not both may be chlorine, have been found to be suitable diluents for cyanobiphenyls. Again, no theoretical considerations fully explain why this class of esters having terminal alkyl groups are compatible with cyanobiphenyls whereas the class of esters previously described having two terminal alkyl groups are not.

Mixtures of 4-cyano-4'-n-pentylbiphenyl and 4'-n-pentylphenyl-3-chloro-4-(4'-n-pentylbenzoyloxy)benzoate were nematic in all proportions, between 0 and 100 percent, of each constituent, and the nematic-isotropic transition temperature was a smooth, continuous function of concentration.

It has been discovered, for example, that cyanoesters are miscible in all proportions with alkyl and alkoxy cyanobiphenyl nematogens. For example, 4-cyano-4'-n-pentylbiphenyl and 4'-cyanophenyl-4-n-heptyl benzoate blended smoothly without any discontinuous physical characteristics. Especially noticable was the absence of the biphenyl induced smectic behavior. The only difference between this system and the previously studied systems is the presence of the cyano functional group on the ester and there is no apparent reason why this should make such a striking difference in the two systems. Based on present knowledge, there is no theoretical explanation available for this unusual behavior.

In practice, it is of advantage to prepare liquid crystal blends which consist essentially of more than two liquid crystal compounds. Each class of liquid crystal, when mixed with various other classes of liquid crystals, may impart either desirable physical or electrical characteristics and, similarly, may impart undesirable characteristics to the blended liquid crystal. While it is impossible to predict in advance what the characteristics of the end product will be from a knowledge of the characteristics of the constituents, as exemplified by the appearance of smectic phase in blends of liquid crystals in which neither constituent exhibited smectic phase in the ambient temperature range, I have discovered, largely through trial and observation, that some particular classes of liquid crystal compounds can be blended with certain other classes, or members of classes, to provide multiple constituent compositions having predictable characteristics. These particular classes or members of classes are those set forth above.

Generally from about 20 to about 90 mole percent of selected ester liquid crystal blended with biphenyl liquid crystal results in liquid crystals having very acceptable nematic and electrical properties. The capacitance and resistivity of the material was significantly improved over pure cyanobiphenyl liquid crystal, resulting in lower power consumption, and the threshold voltage and saturation voltage were low enough to permit actuation in a 12.5 micron thick twisted nematic liquid crystal display cell with voltages of under 3.5 Vrms.

It is convenient, for purposes of explaining the phenomenon which I have discovered, to consider liquid crystals as either PDA or NDA and to blend them as members of one or the other of these dielectric anisotropy materials.

PDA liquid crystals include:
(a) Cyanobiphenyls of the class of compounds having the formula

wherein R is a 1 to 9 carbon atom alkyl or alkoxy group; and (b) Cyanoesters of the class of compounds having the formula

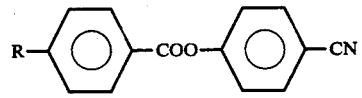

wherein R is a 1 to 9 carbon atom alkyl or alkoxy group.

NDA liquid crystals which are compatible include:
(c) Methoxy esters of the class of compounds having the formula

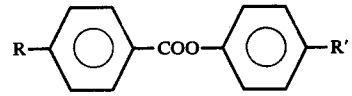

wherein either R or R' is methoxy and R and R' are 1 to 9 carbon atom alkyl or alkoxy groups; and (d) Double esters of the class of compounds having the formula

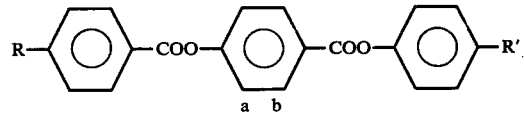

wherein R and R' are 1 to 7 carbon atom alkyl groups and a and b are hydrogen, are either a or b, but not both may be chlorine.

The compatible liquid crystals are useful as blended liquid crystal compositions when mixed in accordance with the following principles.

The PDA constituent comprises one or more cyanobiphenyls from class (a) with or without the addition of one or more cyanoesters from class (b). The PDA constituent comprises at least about 40 mole percent of the cyanobiphenyl. Thus, the PDA liquid crystal constituent generally consists essentially of from about 40 to 100 mole percent of cyanobisphenyls selected from compounds of the formula

wherein R is a 1 to 9 carbon atom alkyl or alkoxy group, and from 0 to about 60 mole percent of cyanoesters selected from compounds of the formula

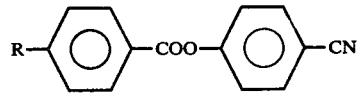

wherein R is a 1 to 9 carbon atom alkyl or alkoxy group.

These liquid crystals are miscible in all proportions without forming smectic phase; however, the biphenyl liquid crystal ceases to be the dominant PDA liquid crystal when it constitutes less than about 40 mole percent. At lower percentages the electrical characteristics of blends become more nearly like those of ester based PDA liquid crystals and less like biphenyl liquid crystals, and the advantages of the cyanobiphenyls are no longer dominant, even though the physical characteristics, e.g., a wide nematic temperature range, are still highly desirable.

The objective was to determine if the high speed characteristics of biphenyl liquid crystals could be conserved in mixtures containing substantial amounts of cyano-ester liquid crystal.

A 1:1 mixture of 4-cyano-4'-n-pentylbiphenyl and 4'-cyanophenyl-4-n-heptylbenzoate gave a uniform nematic phase over a broad temperature range extending above and below room temperature. The rise time, on application of actuating voltage, was not significantly changed from the pure biphenyl nematogen; however, the delay time before rise was slightly increased, using a 3 Vrms actuating voltage. More importantly, the relaxation became a slow, complex, two stage process.

This shortcoming was corrected by adding 0.3 mole of cholesteryl nonanoate and the relaxation time returned to approximately the same as that of the pure cyanobiphenyl liquid crystal and eliminated the complex decay curve. ON-OFF characteristice of a 5 mil (12.5 μm) thick cell utilizing biphenyl liquid crystal alone, biphenyl-cyanoester liquid crystal and cholesteric dope biphenyl-cyanoester liquid crystal are compared in Table I.

Table I

| ON-OFF Comparative values, 12.5 micron thick cell, 3 Vrms applied voltage at 25° C. | | | |
|---|---|---|---|
| Time (ms) | Biphenyl[1] | Biphenyl-Cyanoester[2] | Doped biphenyl Cyanoester[3] |
| Delay | 45 | 40 | 65 |
| ON Rise | 45 | 85 | 50 |
| Total | 90 | 125 | 115 |
| Delay | 70 | 15 | 70 |
| OFF Fall | 75 | 180 | 75 |
| Total | 145 | 195 | 140 |

[1] p-cyano-p'-n-pentylbiphenyl
[2] 1:1 mixture of 4-cyano-4'-n-pentylbiphenyl and 4'-cyanophenyl-4-n-heptylbenzoate
[3] Same as mixture No. (2) plus 0.3 mole percent cholesteryl nonanoate.

Another very unexpected advantage became apparent in tests on the cholesteryl nonanoated doped biphenyl-cyanoester systems, and can be seen from a study of Table I. Note that the rise time of the doped system is about the same as the rise time for the pure biphenyl when the display is turned ON but that there is a significant increase, nearly 50 percent, in the delay time before rise. This flat delay time can be used to significant advantage is pulsed twisted nematic display units since it is possible to apply the ON pulse before the decay during the OFF stage has completed, since the ON delay can overlap the OFF decay. This permits the system to be pulsed at a rate higher than would be possible with a system in which there was a short delay but a longe decay time, such as is the case with the undoped biphenylcyanoester system.

Similar results are obtainable using mixtures of biphenyl based liquid crystals of the general formula:

wherein R is a lower alkyl or alkoxy group having from 1 to 9 carbon atoms, the most satisfactory and preferred member of this class being

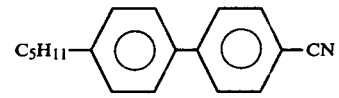

and low molecular weight cyanoesters having the general formula:

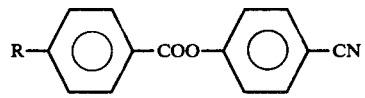

wherein R is a lower alkyl or alkoxy group having from 1 to 9 carbon atoms, preferred members of the class being

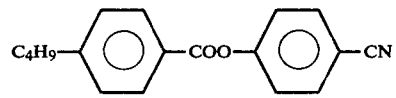

and

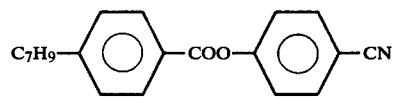

and trace amounts, from between about 0.01 and about 0.8 mole percent, preferably between 0.1 and 0.5 mole percent, of cholesteric liquid crystal.

In general, any low molecular weight cyanoester liquid crystal can be mixed in any proportion to the biphenyl liquid crystal, although the preferred range is from 20 mole percent to 90 mole percent of the biphenyl liquid crystal.

Any cholesteric liquid crystal can be used to dope the biphenyl-cyanoester mixtures in the concentration range of 0.05 to 0.5 mole percent. The classic steroid cholesteric liquid crystals as well as the nonsteroidal cholesteric liquid crystals can be used. Cholesteryl nonanoate and optically active ester liquid crystals of the formula

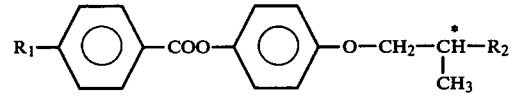

wherein $R_1$ is a lower alkyl group having from 1 to 7 carbon atoms, $R_2$ is a lower alkyl group having from 1 to 5 carbon atoms, the point of asymmetry being indicated by the asterisk, are quite satisfactory dopants in the amounts indicated. Care is required near the upper end of the range indicated to ensure that the cholesteric characteristics do not become dominant.

The NDA constituent may consist essentially of one or more of the methoxy esters of class (c) or one or more to the double esters of class (d) or mixtures of members of these classes of esters. Included within the blends which may comprise all or part of the NDA constituent are the following:

(1) One or more methoxy esters of the formula

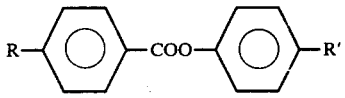

wherein R is methoxy and R' is an alkyl or alkoxy group having 1 to 7 carbon atoms; i.e. mixtures of compounds within this class having differing R' alkyl or alkoxy substituents.

(2) One or more methoxy esters of the formula

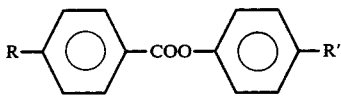

wherein R' is methoxy and R is an alkyl or alkoxy group having 1 to 7 carbon atoms; i.e. mixtures of compounds within this class having differing R alkyl or alkoxy substituents.

(3) Mixtures of methoxy esters of the formula

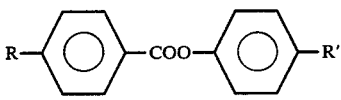

wherein R is methoxy and R' is a 1 to 7 carbon atom alkyl or alkoxy group, with methoxy esters of the formula

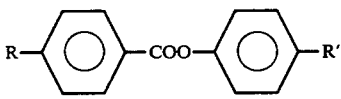

wherein R is a 1 to 7 carbon atom alkyl or alkoxy group and R' is methoxy. Included in these mixtures would be blends of mixtures as defined in paragraph (1) above with mixtures as defined in paragraph (2) above.

(4) One or more double esters of the formula

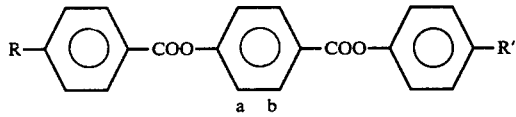

wherein R and R' are 1 to 7 carbon atom alkyl groups and a and b are hydrogen, and either a or b, but not both may be chlorine.

(5) Mixtures of double ester liquid crystals as defined in paragraph (4) with liquid crystal compounds or mixtures of compounds as defined in paragraph (1), (2) or (3) above.

Double esters of class (d) and mixtures of the same as defined in paragraph (4) comprise no more than about 25 mole percent of the final liquid crystal composition and, when mixed with other NDA liquid crystals, constitute no more than about 25 mole percent of the NDA constituent. Optimally, the class (d) double esters, comprise from about 15 to about 20 percent of the NDA constituent of the liquid crystal composition.

The NDA constituent may consist essentially of all methoxy ester or mixtures of methoxy esters in all proportions; i.e. the NDA may range from 75 to 100 mole percent methoxy ester and from 0 to 25 mole percent double ester, the optimum range for double ester, when present, being from about 15 to about 20 mole percent.

EXAMPLE

A mixture consisting of 40 parts of 4'-cyanophenyl-4-n-heptylbenzoate, 40 parts of 4-cyano-4'-n-pentylbiphenyl and 20 parts of 4'-n-pentylphenyl-3-chloro-4-(4'-n-pentylbenzoyloxy)benzoate had the following electrooptic characteristics (at 25° C. 12.5 micron thick cell).

Threshold Voltage 0.95v
Saturation Voltage 0.70v
Turn ON Delay Time 60ms (at 3v)
Rise Time 60ms (at 3v)
Decay Time 300ms (at 3v)

A particularly interesting example of the unpredictability of physical and electrical characteristics of blended liquid crystals generally, as distinct from systems such as described in which criteria for prediction have been worked out by experimentation and observation, is the discovery that certain esters which are incompatible with cyanobiphenyls can be used in liquid crystal blends when certain other esters are present, with results of higher nematic-isotropic temperatures and hence requires less double esters.

For example, it has been pointed out that cyanobiphenyls of Class (a) are not generally miscible with esters having the formula

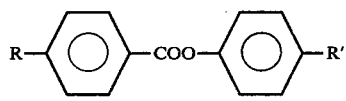

wherein R and R' are alkyl or alkoxy groups. As described, a special class of compounds of this general formula, those in which either or both of R and R' are methoxy have been found to be compatible. When both R and R' are alkyl or when both R and R' are 2 carbon or more alkoxy or when one of R and R' is alkyl and the other is 2 carbon or more alkoxy, then smectic phase develops, often over such a broad range as to make the entire system unsuitable for nematic liquid crystal use.

I have discovered, however, the smectic phase in compositions which consist essentially of cyanobiphenyls of the formula

wherein R is a 1 to 9 carbon alkyl or alkoxy group, mixed with esters of the formula

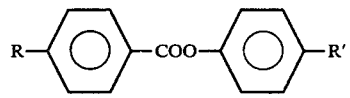

wherein R and R' are 1 to 7 carbon alkyl or 2 to 7 carbon alkoxy groups, can be suppressed by adding yet another ester or mixtures of esters, far below ambient temperatures and yet perserving high nematic-isotropic transition temperatures and the good electro-optical characteristics.

The preferred members of esters of the general formula

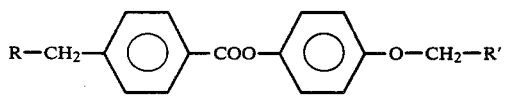

or

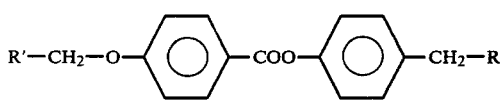

wherein R and R' are 1 to 6 carbon aliphatic chain, have higher nematic-isotropic transition temperature.

More specifically 4'-n-hexyloxy-phenyl-4-n-butylbenzoate is suitable.

The third component which can be used to suppress the smectic mesophase are described below.

(1) One or more methoxy esters of the formula

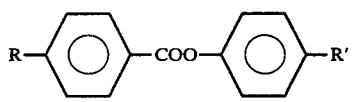

wherein R is methoxy and R' is an alkyl or alkoxy group havin 1 to 7 carbon atoms; i.e. mixtures of compounds within this class having differing R' alkyl or alkoxy substituents.

(2) One or more methoxy esters of the formula

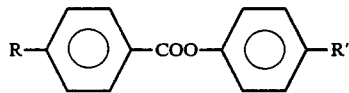

wherein R' is methoxy and R is an alkyl or alkoxy group havin 1 to 7 carbon atoms; i.e. mixtures of compounds within this class having differing R alkyl or alkoxy substituents.

(3) Mixtures of methoxy esters of the formula

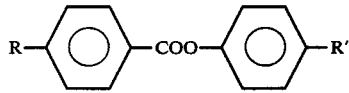

wherein R is methoxy and R' is a 1 to 7 carbon atom alkyl or alkoxy group, with methoxy esters of the formula

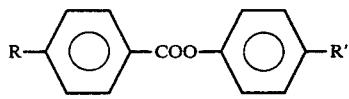

wherein R is a 1 to 7 carbon atom alkyl or alkoxy group and R' is methoxy. Included in these mixtures would be blends of mixtures as defined in paragraph (1) above with mixtures as defined in paragraph (2) above.

One or more double esters of the formula

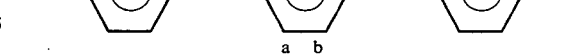

wherein R and R' are 1 to 7 carbon atom alkyl groups and a and b are chlorine or hydrogen, and either a or b, but not both a and b, may be chlorine.

(5) Mixtures of double ester liquid crystals are defined in paragraph (4) with liquid crystal compounds or mixtures of compounds as defined in paragraph (1), (2) or (3) above.

Double esters of class (d) and mixtures of the same as defined in paragraph (4) comprise no more than about 25 mole percent of the final liquid crystal composition and, when mixed with other NDA liquid crystals, constitute no more than about 20 mole percent of the NDA constituent. Optimally, the class (d) double esters, comprise from about 15 to about 20 percent of the NDA constituent of the liquid crystal composition.

The NDA constituent may consist essentially of all methoxy ester or mixtures of methoxy esters in all proportions; i.e. the NDA may range from 75 to 100 mole percent methoxy ester and from 0 to 25 mole percent double ester, the optimum range for double ester, when present, being from about 15 to about 20 mole percent.

EXAMPLE

A mixture of 45 mole percent 4'-n-hexyloxyphenyl-4-n-butylbenzoate in 4-cyano-4'-n'pentylbiphenyl was mixed in proportions of from 0 to 100 percent with 4'-n-pentylphenyl-3-chloro-4-(4'-n-pentylbenzoyloxy)-benzoate. The mixture was smectic in concentrations of 4'-n-pentylphenyl-3-chloro-4-(4'-n-pentylbenzoyloxy)-benzoate below about 20 mole percent at lower temperatures; however, the nematic phase extended from below 0° C. to well above ambient in concentrations above this.

EXAMPLE

A mixture consisting of 23.87 parts of 4'-n-hexyloxyphenyl-4-n-butylbenzoate, 56.17 parts of 4-cyano-4'-n-pentyl-biphenyl and 19.96 parts of 4'-n-pentylphenyl-3-chloro-4-(4'-n-pentylbenzoyloxy) benzoate had the following electrooptic characteristics (12.5 micron thick cell).

|  | 25° C. | 0° C. |
|---|---|---|
| Threshold Voltage | 1.05v | 1.40v |
| Saturation Voltage | 1.85v | 2.50v |
| Turn ON Delay Time | 40ms (3v) | 200ms (3v) |
| Rise Time | 60ms | 400ms |
| Decay Time | 210ms | 600ms |

A number of advantages of these compositions are of considerable importance. For example:

One can achieve any desired nematic temperature ranges of mixtures which consist of completely chemically inert, moisture resistant materials. This will ensure the longevity of display life and simplify processes in packaging.

One can freely adjust the concentrations of the positive dielectric anisotropy nematogens which will yield mixture liquid crystals with flexible dielectric anisotropy values, which effectively determine the threshold voltages and response times as well as the cell cepacitances.

A third constituent in any of the foregoing blended liquid crystal compositions may be an optically active liquid crystal, such as the optically active esters described before and sterol derived esters such as colesteryl nonanoate. Of course, the class of suitable optically active compounds is not limited to these examples and includes optically active liquid crystals generally.

In general, the inventive concept set forth in this patent and which I claim as my invention is the blending of cyanobiphenyl liquid crystals with compatible ester liquid crystals. These blended compositions may also include an optically active liquid crystal, in minor proportions.

Particular facets of the invention include:

(i) Blending cyanobiphenyl liquid crystals with compatible cyanoester liquid crystals to form a PDA liquid crystal composition.

(ii) Blending cyanobiphenyl liquid crystals with compatible NDA ester liquid crystals to form PDA-NDA blend liquid crystal compositions.

(iii) Blending cyanobiphenyl liquid crystals with compatible NDA ester liquid crystals and with compatible cyanoester liquid crystals to form PDA-NDA blend liquid crystal compositions.

(iv) Blending cyanobiphenyl liquid crystals with incompatible NDA ester liquid crystals, of the type which result in smectic phase, and with compatible NDA ester liquid crystals to suppress smectic phase and to form PDA-NDA blend liquid crystals compositions.

(v) Blending minor proportions of optically active liquid crystals with any of the above blends In each of the above cases, which are neither exhaustive nor definitive, the blended compositions may include constituents which are themselves made up of multiple components.

Additionally, dyes, special effect materials and other constituents which do not change the nature of these compositions may be included in these liquid crystals without departing from the invention as described and defined.

Specific examples and precise information as to compositions, processes, steps and other facets of the subject matter of the patent are given herein; however, these precise and detailed data do not constitute nor limit the inventive concept and are provided to aid those skilled in the art to practice the invention. The scope of the invention is defined and limited only by the claims.

References cited in the Specification

The following patents and publications are incorporated herein as background material and no representation is made respecting pertinence or completeness:

1. Brown, G. H., CHEMISTRY, 40, 10, 1967
2. Brown, G. H., ANAL. CHEM., 41, 26A 1969
3. Brown, G. H., Shaw, W. G., CHEM. REV., 57, 1049, 1957.
4. AMERICAN CHEMICAL SOCIETY, ORDERED FLUIDS & LIQUID CRYSTALS. (Advances in Chemistry. Ser., No. 63) 1967. 11.50 (ISBN 0-8412-0064-5) Am. Chemical.
5. Brown, G., et al. LIQUID CRYSTALS PROCEEDINGS OF 1965 CONFERENCE, 1967 30.00 Gordon.
6. Gray, G. W., MOLECULAR STRUCTURE & THE PROPERTIES OF LIQUID CRYSTALS. 1962 11.00 (SBN 0-12-296556.6) Acad. Pr.
7. Schuele, Donald E., ed. A REVIEW OF THE STRUCTURE & PHYSICAL PROPERTIES OF LIQUID CRYSTALS. 11.50 Chem. Rubber.
8. U.S. Pat. No. 3,322,485, R. Williams - May 30, 1967.
9. U.S. Pat. No. 3,540,796, J. E. Goldmacher et al, Nov. 17, 1970.
10. U.S. Pat. No. 3,597,044, J. A. Castellano, Aug. 3, 1971.
11. U.S. Pat. No. 3,656,834, I. Haller, et al, Apr. 18, 1972.
12. U.S. Pat. No. 3,675,987, M. J. Rafuse, July 11, 1972.
13. U.S. Pat. No. 3,703,329, J. A. Castellano, Nov. 21, 1972.
14. U.S. Pat. No. 3,731,986, J. L. Fergason, May 8, 1973.
15. Sussman, A., IEEE TRANS. ON PARTS, HYBRIDS, AND PACKAGING, Vol. p11p-8, No. 4, Dec. 1972, pp. 24–37.
16. Gray, G. W., Harrison, K. J., Nash, J. A. and Raynes, E. P., Electron Lett., 1973, pp. 616–617.
17. Raynes, E. P., "Improved Contrast Uniformity in Twisted Nematic Liquid Crystal Electro-Optic Display Devices," (Copy transmitted herewith).
18. Gray, G. W., Harrison, K. J., and Nash, J. A., Electron. Lett., 1973, 9, pp. 130–131.
19. Gray, G. W., Harrison, K. J., Nash, J. A., Constant, J., Hulme, D. S., Kirton, J., & Raynes, E. P., "Stable, Low Melting Nematogens of Positive Dielectric Anisotropy for Display Devices", presented at the 166th National Meeting of the American Chemical Society, Chicago, 1974. (Copy submitted herewith).
20. Harrison, I. T. and Harrison, S., COMPENDIUM OF ORGANIC SYNTHETIC METHODS, Wiley-Interscience, N.Y., 1971, pp. 464–465.
21. March, J., ADVANCED ORGANIC CHEMISTRY: REACTIONS, MECHANISMS AND STRUCTURE, McGraw-Hill Book Co., N.Y., 1968, pp. 777–778.
22. Fieser, L.F. and Fieser, M., REAGENTS FOR ORGANIC SYNTHESIS, John Wiley and Sons, Inc., N.Y., 1967, pp. 769–770.

What is claimed is:

1. Nematic liquid crystals having biphenyl liquid crystal dominant electro-optic characteristics and a wide nematic phase temperature range including ambient temperature actuatable in a 12.5 micron thick twisted nematic liquid crystal display cell by an actuation voltage of less than about 3.5 Vrms comprising one or more compounds selected from 4'-substituted-4-cyanobiphenyl liquid crystals having the formula

wherein r is a 1 to 9 carbon alkyl or alkoxy group, blended with one or more compatible 4,4'-disubstituted phenyl benzoate liquid crystals selected from the group consisting of:

compounds having the formula

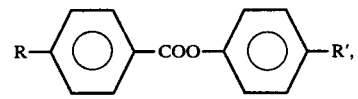

wherein one of R and R' is methoxy and R the other of and R' is 1 to 7 carbon atom alkyl or alkoxy groups; and compounds having the formula

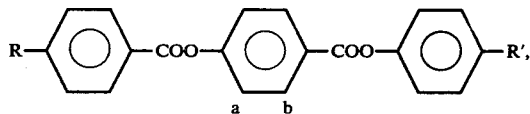

wherein R and R' are 1 to 7 carbon alkyl groups, a or b being chlorine, and the other of a or b being hydrogen.

2. Liquid crystals as defined in claim 1 wherein said 4'-substituted-4-cyanobiphenyl liquid crystals comprise from about 10 percent to about 80 mole percent of the liquid crystal composition.

3. liquid crystals as defined in claim 1 wherein the 4'-substituted-4-cyanobiphenyl is 4-cyano-4'-n-pentyl-biphenyl.

4. Liquid crystals as defined in claim 1 wherein the 4,4'-disubstituted phenyl benzoate ester is 4'-n-pentyl-phenyl-3-chloro-4-(4'-n-pentylbenzoyloxy)benzoate.

5. Liquid crystals as defined in claim 1 further comprising at least one compound having a formula

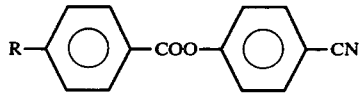

wherein R is a 1 to 9 carbon atom alkyl or alkoxy group.

6. Liquid crystals as defined in claim 5 wherein said 4'-substituted-4-cyanobiphenyl liquid crystals comprise from about 10 percent to about 80 mole percent of the liquid crystal composition.

7. Liquid crystals as defined in claim 5 comprising a positive dielectric anisotropy constituent which includes said 4'-substituted-4-cyanobiphenyl and up to about 60 mole percent of said cyanoester.

8. Liquid crystals as defined in claim 5 wherein the 4'-substituted-4-cyanobiphenyl is 4-cyano-4'-n-pentyl-biphenyl.

9. Liquid crystals as defined in claim 5 wherein the 4,4'-disubstituted phenyl benzoate ester is 4'-n-pentyl-phenyl-3-chloro-4-(4'-n-pentylbenzoyloxy)benzoate.

10. Liquid crystals as defined in claim 9 wherein said compound having the formula

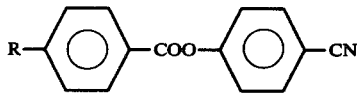

is selected from a group consisting of 4'-cyanophenyl-4-n-heptylbenzoate and 4'-cyanophenyl-4-n-butylbenzoate.

UNITED STATES PATENT AND TRADEMARK OFFICE
CERTIFICATE OF CORRECTION

PATENT NO. : 4,147,651
DATED : April 3, 1979
INVENTOR(S) : Chan S. Oh

It is certified that error appears in the above-identified patent and that said Letters Patent are hereby corrected as shown below:

Claim 1, lines 15 and 16, delete "wherein one of R and R' is methoxy and R the other of" and substitute --wherein one of R or R' is methoxy and the other of R--.

Signed and Sealed this

Sixteenth Day of October 1979

[SEAL]

Attest:

RUTH C. MASON
*Attesting Officer*

LUTRELLE F. PARKER
*Acting Commissioner of Patents and Trademarks*